United States Patent [19]

Craine et al.

[11] Patent Number: 4,634,882
[45] Date of Patent: Jan. 6, 1987

[54] OPTICAL DEVICE FOR DISPLAYING A LARGE TWO DIMENSIONAL IMAGE

[75] Inventors: Eric R. Craine; David Forbes; Thomas A. Sargent, all of Tucson, Ariz.; John S. Scott, Melbourne, Fla.

[73] Assignee: Karmar Research Partnership, Torrance, Calif.

[21] Appl. No.: 702,950

[22] Filed: Feb. 19, 1985

[51] Int. Cl.⁴ .................. H01J 40/14; H04N 1/00
[52] U.S. Cl. .................. 250/578; 358/212
[58] Field of Search .................. 250/578, 208–209; 358/212, 213, 285, 293, 294, 209; 350/169, 173, 174

[56] References Cited

U.S. PATENT DOCUMENTS

| | | |
|---|---|---|
| 1,319,292 | 10/1919 | Kunz . |
| 1,320,625 | 11/1919 | Kunz . |
| 3,017,454 | 1/1962 | James et al. . |
| 3,676,866 | 7/1972 | Freedman . |
| 3,990,771 | 11/1976 | Hundelshausen et al. . |
| 4,005,285 | 1/1977 | Price . |
| 4,009,388 | 2/1977 | Seachman . |
| 4,012,587 | 3/1977 | Ochi et al. . |
| 4,053,773 | 10/1977 | Deresh . |
| 4,099,841 | 7/1978 | Ellis . |
| 4,256,969 | 3/1981 | Lianza . |
| 4,272,684 | 6/1981 | Seachman . |
| 4,481,539 | 11/1984 | Meise et al. ............ 358/213 |
| 4,555,733 | 11/1985 | Garcia ............ 250/578 |

Primary Examiner—Edward P. Westin
Attorney, Agent, or Firm—Poms, Smith, Lande & Rose

[57] ABSTRACT

An optical device for displaying a large, two dimensional image is shown which utilizes a beam splitter having four faces upon which are mounted photosensor arrays. The photosensor arrays are mounted in a mosaic-like pattern upon each face with the pattern on one face differing from the pattern on the remaining three faces. Through this arranngement, standard photosensor arrays may be used to build a device that is capable of displaying a large image with no limitation on image side due to limitations on photosensor size.

26 Claims, 5 Drawing Figures

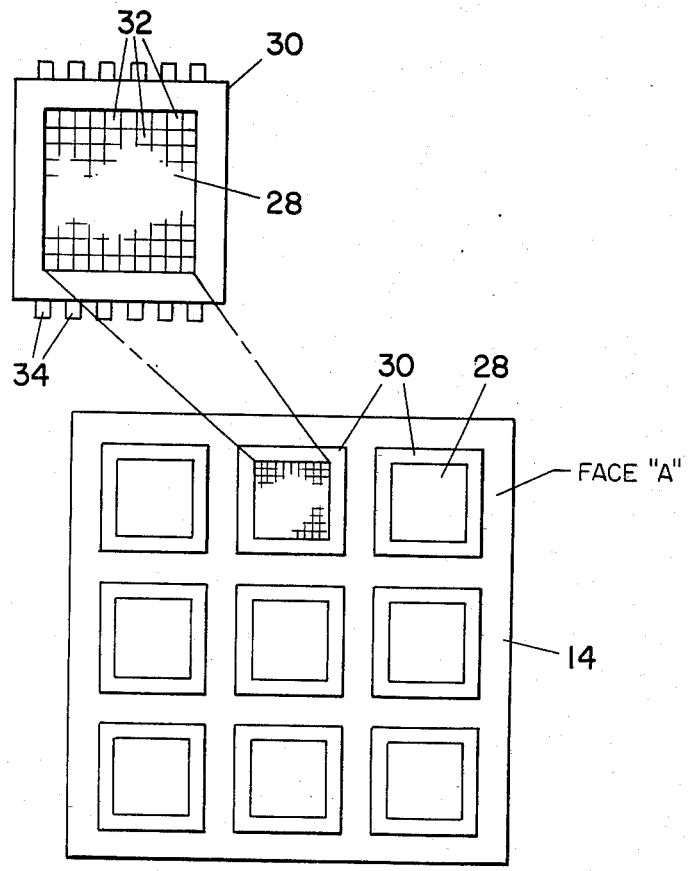

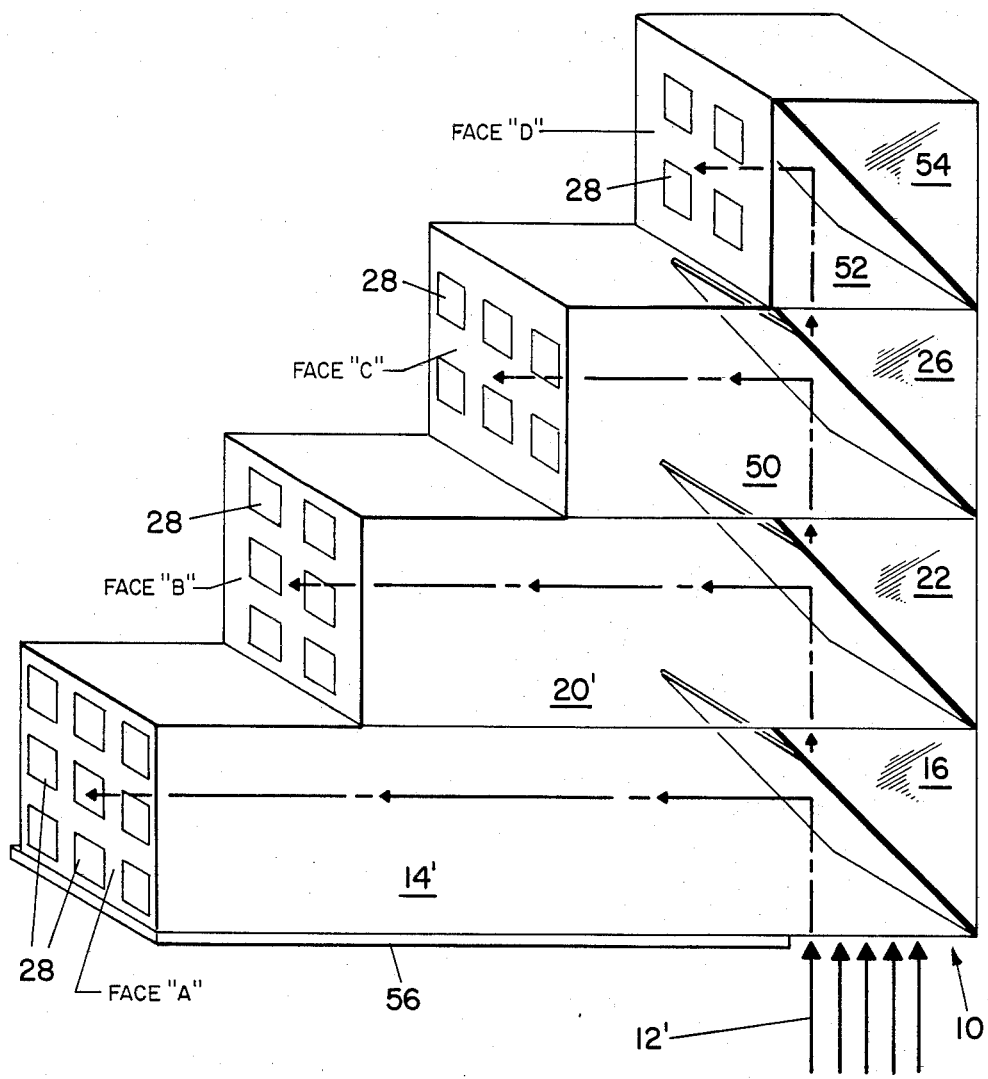

OPTICAL DEVICE FOR DISPLAYING A LARGE TWO DIMENSIONAL IMAGE

FIELD OF THE INVENTION

The present invention relates to an optical device for displaying a two dimensional image and, more particularly, to an optical device using a beam splitter and uniquely arranged electronics to create a digital camera which is capable of detecting a large-sized image with high resolution and high speed acquisition of the detected data to establish a display.

BACKGROUND OF THE INVENTION

It is known to utilize a beam splitter when one wishes to view two or more identical images. One use of a beam splitter in the art of photography presents an identical image to three image planes to create a color photograph. This use is illustrated in U.S. Pat. No. 1,319,292 which issued Oct. 21, 1919, by W. H. Kunz. The Kunz patent discloses the concept of forming some of the reflective surfaces within the beam splitter as partially reflective surfaces, while the final surface is wholly reflective. The patent fails to disclose a need for identical path lengths between the lens and the image planes, however. In a second patent, U.S. Pat. No. 1,320,625, issued Nov. 4, 1919, by W. H. Kunz, the concept of equal path lengths between the lens and the image planes is disclosed. The second Kunz patent also discloses a fourth beam splitter for a color camera.

The further utilization of a beam splitter may be found in U.S. Pat. No. 3,017,454, issued Jan. 16, 1962, by I. J. P. James, et at. This patent is noteworthy as it shows a color television camera which incorporates a beam splitting configuration with three reflective surfaces for directing a common image toward three pickup tubes where the optical path length between the lens and each tube is a substantially equal distance. A beam splitter wherein each prism within the splitter reflects a different percentage of the light, may be found in U.S. Pat. No. 4,099,841, issued July 11, 1978, by S. M. Ellis.

From the foregoing, it will be seen that the utilization of a beam splitter to provide identical images at several image planes is known.

The next development step in the prior art was to place a plurality of photosensors or photodetectors at the image plane to detect the image. Such photosensors may include charge coupled devices (CCD), charged injection devices (CID), or the like. One such arrangement utilizing a beam splitter and photosensors may be found in U.S. Pat. No. 4,005,285, issued Jan. 25, 1977, by E. E. Price. This patent teaches a device for improving the resolution of an image by utilizing a beam splitter to optically compact the photosensors in a continuous image line. However, this device does not provide for the rapid, two dimensional image of a two dimensional display as the device is limited to a linear arrangement. A second linear array that also improves resolution may be found in U.S. Pat. No. 4,009,388, issued Feb. 22, 1977, by N. J. Seachman.

A prior art patent utilizing a beam splitter that reports to produce a two dimensional display may be found in U.S. Pat. No. 4,053,773 which issued Oct. 11, 1977, by B. A. Deresh, et al. While this patent discusses a two dimensional display, it must be noted that the patent is limited by the physical size of the photosensor or the photodetector array. That is, the largest dimensions of the two dimensional display to be formed by the Deresh, et al. invention are limited by the size of array that one can fabricate.

SUMMARY OF THE INVENTION

It is, therefore, an object of the present invention to provide a large optical device for displaying a two dimensional image in which the size of that image is not limited by the size of the photosensor array that one can manufacture.

It is another object of the invention to provide a large display having a high resolution with high speed data acquisition.

Further objects of the present invention include the provision of a large display that is easily repaired, economical, and capable of high speed, high resolution without the use of a mechanical scanning device. Such a display is thus more reliable.

The foregoing objects are accomplished through the use of a beam splitter which receives an image and divides that image into four images presented simultaneously at four separate mage planes. The beam splitter is characterized by an equal path length between an incoming image lens and the four image planes. The beam splitter is further characterized by adjustable reflectivity at each of the reflective surfaces to assure the presentation of an equal amount of electromagnetic energy at each of the four image planes.

Mounted upon, or in juxtaposition with, each image plane are a plurality of photosensor arrays which may be formed by charged couple devices (CCD), charged injection devices (CID), photovoltaic or photoconductive cells. Each photosensor array comprises a plurality of individual elements which are mounted within the array in a side-by-side, row-by-row arrangement and retained in that mounted configuration by a surrounding housing. A set of photosensor arrays is arranged upon each image plane of the beam splitter in a mosaiclike pattern so that each array is separated along each edge and at each corner thereof from the other. In this manner, the housing that surrounds the individual elements of each photosensor array does not interfere with the image pattern to be detected by the remaining arrays on the remaining image planes. The photosensor arrays on an individual image plane do not create a complete display pattern. The complete pattern is formed by corresponding mosaic patterns upon the three remaining image planes, i.e., the sum of the four mosaic patterns fully covers the image inputted to the display device as displayed upon each of the four image planes.

If the displayed image is to be made larger, the size of the image planes within the beam splitter is increased to mount a larger mosaiclike pattern of photosensor arrays upon each plane. It will be understood that a larger number of photosensor arrays may be simply added to each image plane by expanding the mosaiclike pattern. The larger display is thus obtained without the need to construct larger photosensor arrays, as in the prior art.

DESCRIPTION OF THE DRAWINGS

A better understanding of the present invention will be had after a careful consideraiton of the following detailed specification and drawings, wherein:

FIG. 2 is a diagram illustrating the arrangement of a single photosensor array as it is placed within a mosaic-like pattern upon a single face of a beam splitter;

FIG. 3 is a diagram illustrating a mosaic pattern of a photosensor arrays upon the four image planes of the beam splitter;

FIG. 5 is a device similar to FIG. 1 adapted for direct, real time digital imagery of a radiological projection.

DESCRIPTION OF THE PREFERRED EMBODIMENTS

Figure 1:
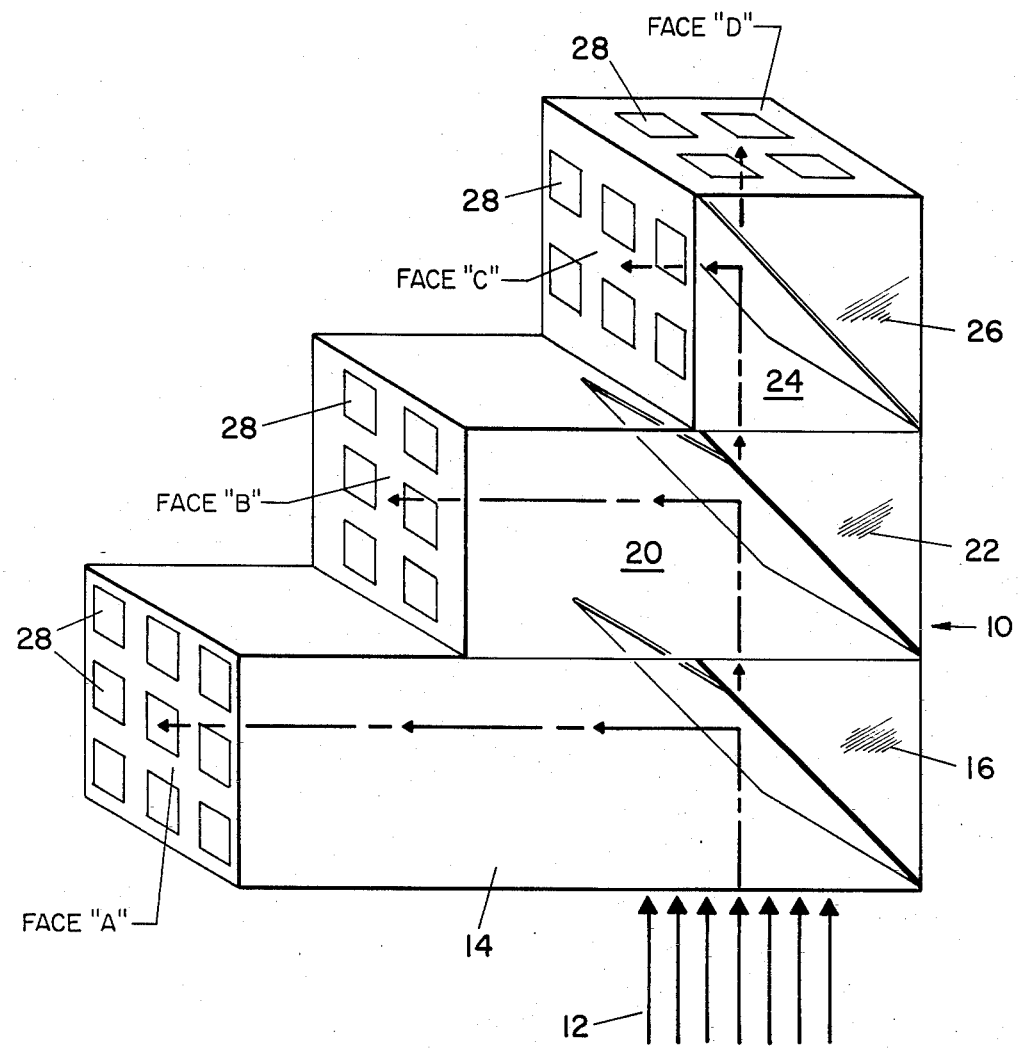
FIG. 1 is a perspective view showing the optical device for displaying a two dimensional image of the present invention.

Referring now to the drawings, FIG. 1 shows an optical device in the form of a beam splitter 10 which is capable of displaying an image focused upon its lower surface, as illustrated by the rays 12, in four equal images upon four separate image planes designated: Faces A, B, C, and D. The beam splitter 10 comprises two blocks and four prisms whose size is an important feature of the present invention. The first block 14 includes upper and lower surfaces and right and left-hand ends. The lower surface of block 14 receives the light rays 12 which form the image to be displayed upon Face A formed on the left-hand end of block 14. Block 14 may be specially ground at its lower surface to form a lens for focusing rays 12 although such an arrangement is not shown in FIG. 1. The right-hand end of block 14 is chamfered at 45° to receive a prism 16. The interface between block 14 and prism 16 is coated with a partially reflective coating to permit the reflection of approximately 25% of the electromagnetic energy within rays 12 and past 75% thereof. It will be noted that block 14 is 3 times as long as its height to assure that the path length traveled by the rays 12 of electromagnetic energy is equal throughout the optical device formed by beam splitter 10.

Mounted upon the upper surface of block 14 is a second block 20 that is ⅔rds as long as block 14. The right-hand end of block 20 is chamfered to receive a second prism 22 while the left-hand end of block 20 forms the image plane designated as Face B. The interface between block 20 and prism 22 is again coated to permit the reflection of 33⅓% of the energy striking it, while the remaining 66.7% is passed through prism 22 to a third prism 24.

The cross section of prism 24 is a right angle, isoceles triangle whose legs, are equal in length to the height of blocks 14 and 20. The right-hand end or hypotenuse of prism 24 receives a fourth prism 26 while the left-hand end thereof forms Face C. The interface between prism 24 and prism 26 is coated to reflect 50% of the energy striking it, while the other 50% passes through prism 26 to the image plane on the upper surface of prism 26 designated as Face D.

Mounted upon the Faces A, B, C and D are a plurality of photosensor arrays 28 which may be formed from charged couple devices (CCD), charged injection devices (CID), photovoltaic cells, photoconductive cells, or the like. In the preferred embodiment, CCDs are used. As best seen in FIG. 2, each photosensor array 28 comprises a surrounding array housing 30 and a plurality of individual photosensor elements 32. The photosensor elements 32 are wired by suitable wiring, not shown, to pins 34 which are attached to the outer edges of the housing 30.

The photosensor elements 32 are arranged in a side-by-side, row-by-row pattern such that each element is separated from the other element only by a distance sufficient to accommodate a bonding material for binds one element to the other. However, the outer edge of the photosensor elements is, by necessity, surrounded by the housing 30 which forms the photosensor array 28.

It will now be understood that it is impossible to place a plurality of photosensor arrays 28 side by side upon a single image plane, such as Face A, without creating dead areas which cannot be sensed by the photosensor elements 32 of arrays 28 due to housing 30. This problem is eliminated through the use of the four Faces A–D. It will be seen that each Face A–D has a mosaic-like pattern thereon which is different from the other faces. By utilizing four separate mosaiclike patterns on four faces, Faces A–D, it is possible to cover, and thus display, the full image formed by rays 12, as shown in FIG. 3.

FIG. 3 illustrates a typical pattern for utilizing a plurality of photosensor arrays 28 mounted upon Faces A–D. The reader will understand that other mosaiclike patterns are also available within the teachings of the invention. What the reader might not understand is that four faces are required in order to fully cover and display the image formed by the rays 12. The reason for this is that no photosensor array 28 may be mounted upon one of the Faces A–D of the beam splitter 10 with a contacting edge of contacting corner. Each photosensor array 28 must be separated around its four edges and at its four corners. As each array 28 is generally square or rectangular, there are four edges or four covers that must be separated. Thus, the need for four surfaces. While a photosensor could be formed as a pentagon or a hexagon using five or six surfaces, a triangular configuration will not produce the desired separation. Further, a photosensor array 28 without a flat edge will not lend itself to the creation of the mosaiclike pattern required by the invention. By utilizing the four surfaces, it is possible to recombine the photosensor arrays 28 upon each of the four image planes into a single display pattern representing the full image 12.

FIG. 3 illustrates the preferred mounting arrangement of the photosensors 28 which are formed in a square configuration with a surrounding housing 30 that can have any desired shape. Each photosensor is separated from the other in both the X and Y directions by a distance equal to the length of the side of the square. Thus, when the four mosaic like patterns on Faces A–D are recombined as shown in FIG. 3, there is no unutilized portion of the photosensors 28 and no surface uncovered thereby.

It should be noted that only FIG. 3 shows the precise dimensions of the preferred embodiment, FIGS. 1, 2, 4 and 5 being shown as imprecise sketches.

Figure 4:
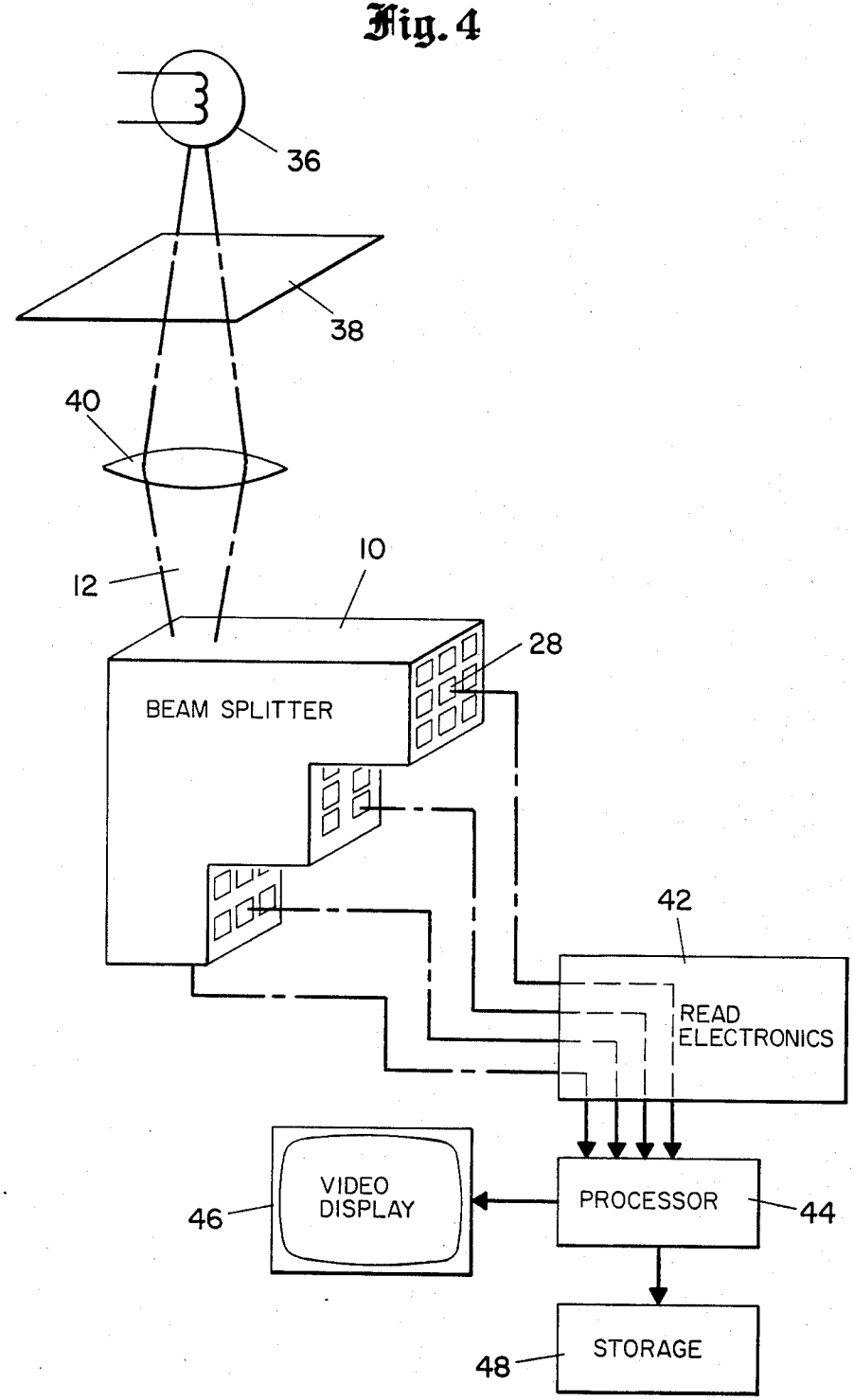
FIG. 4 is a schematic diagram of an optical device for displaying a two dimensional image of the present invention.

As seen in FIG. 4, a typical system utilizing the optical device formed by beam splitter 10 for displaying a two dimensional image includes a source of electromagnetic energy 36 that illuminates a screen 38 which contains the image to be displayed. The screen may be a film, transparency or a real action screen. For example, the screen 36 could be the energy from an X-ray machine which is focused by a suitable focusing lens 40 into the rays 12 that form the image to be displayed. The image is then split by the beam splitter 10 to Faces A–D. Suitable wiring is connected to the photosensor arrays 28 within the space left between the arrays on each of the Faces A–D. The signals generated by the photosensors are transmitted over suitable connections to read electronics 42 which control the passage of these signals to a processor 44.

The processor 44 may be a computer for storing the information received from read electronics 42 as a series of high or low signals or as a signal that varies between a value of 0 and 9 to represent a gray scale, for example. The processor 44 then presents the stored data to a suitable display 46, such as a video display, or to suitable storage device 48, such as magnetic tape, magnetic discs or optical discs. Through this arrangement, it is possible to display a two dimensional image almost simultaneously with the presentation thereof through lens 40. Such an arrangement permits a rapid reproduction of vital information such as information generated by a photograph of a human eyeball or by the radiological scanning of a human heart.

Referring now to FIG. 5, a variation of FIG. 1 is shown wherein the two blocks, 14 and 20, and four prisms, 16, 22, 24 and 26, that formed the beam splitter 10 of FIG. 1 are modified. Prism 24 of FIG. 1 is replaced with a block 50, which is equal in size to the block 20 of FIG. 1. The blocks 14 and 20 are increased in length to be four and three times their height, respectively, see blocks 14' and 20'. Mounted upon Face D of FIG. 1, is a pair of prisms 52 and 54 which form a new Face D on the left-hand surface of Prism 52. As the interface between prism 52 and 54 is made 100% reflective, block 52 becomes unnecessary. Mounted upon the lower surface of block 14' is a lead plate 56. It will now be understood that the rays 12' may be X-rays which are shielded from the photosensor arrays 28 by the lead plate 56. In this arrangement, it is possible to provide a real time, direct digital radiological display by directing the X-ray energy through beam splitter 10. The X-ray energy will pass through the top of prism 54, while visual light and some inferred and ultraviolet light will be reflected toward Faces A–D where suitable sensor elements within photosensor arrays 28 are mounted.

In the preferred embodiment, the photosensor arrays 28 are mounted directly upon the Faces A–D. It will be understood that these arrays may be mounted at a distance from Faces A–D within the teachings of the invention. In mounting the plurality of photosensor arrays 28, it is generally desirable to locate one array in a fixed position and then adjust the other arrays with respect thereto. The adjustments required include the need to translate the photosensor arrays in the X and Y directions, rotate the photosensors, and adjust them toward and away from each Face A–D in the Z direction. It has been found that a convenient way for mounting the arrays 28 to Faces A–D is to coat the arrays with a transparent, ultraviolet setting, bonding material. Once each of the rays is properly aligned, an ultraviolet image may be passed through the beam splitter 10 at the position indicated by rays 12 for fixing the bonding material and the arrays.

It will be understood that the images on Faces A–D in FIG. 5 will be identical. However, in FIGS. 1 and 4 the image on Face D is flipped 180 degrees from the others because the rays 12 which form the image on Face D have not been reflected from one of the reflective surfaces. Thus, these images are substantially identical. The electronics shown in FIG. 3 may be adjusted to correct the 180 degree rotation to create a complete image or the hardward of FIG. 5 may be used.

While more than one embodiment of the invention has been described, the invention should be limited only by the appended claims.

We claim:

1. An optical device for displaying a two dimensional image, comprising:
    beam splitter means for receiving said image having at least four display surfaces for displaying said image upon each of said four surfaces;
    a plurality of photosensor means mounted in at least four mosaiclike patterns, in juxtaposition with said at least four surfaces; and
    each mosaiclike pattern juxtaposed with each surface having a different pattern from said remaining mosaiclike patterns.

2. An optical device, as claimed in claim 1, wherein said image upon each of said four surfaces is substantially identical.

3. An optical device, as claimed in claim 1, wherein said photosensor means are mounted directly upon said at least four surfaces.

4. An optical device, as claimed in claim 1, wherein said each mosaiclike pattern juxtaposed with each surface comprise a plurality of photosensor means mounted with the edge of each photosensor means separated from the edge of the next photosensor means and the corner of each photosensor means separated from the corner of the next photosensor means.

5. An optical device, as claimed in claim 1, wherein each of said plurality of photosensor means comprises a plurality of individual light sensor elements mounted within a surrounding housing mounting package with said individual light sensor elements closely spaced to one another, wherein said surrounding housing is prevented from interfering with said image by said separation of said photosensor means in each mosaiclike pattern.

6. An optical device, as claimed in claim 5, additionally comprising:
    said individual light sensor elements are charged coupled devices;
    said photosensor means are arrays of charged coupled devices;
    processing means; and
    means connecting said individual light sensor elements to said processing means.

7. An optical device, as claimed in claim 5, wherein said individual light sensor elements are charge injection devices.

8. An optical device, as claimed in claim 5, wherein said individual light sensor elements are photoconductive cells.

9. An optical device, as claimed in claim 5, wherein said individual light sensor elements are photovoltaic cells.

10. An optical device, as claimed in claim 5, wherein said surrounding housings that mount said individual light sensor elements mount said elements in a configuration having four or more flat sides.

11. An optical device, as claimed in claim 10, wherein said four or more flat sides form a square of light sensor elements and each square of light sensor elements is separated from the next square by a distance equal to length of one of said sides.

12. A device for displaying a two dimensional image, comprising:
    beam splitter means for receiving said image having a plurality of and at least four image display planes;

a plurality of photosensor means mounted upon each of said plurality of image display planes;

said plurality of photosensor means mounted upon each individual image display plane with each photosensor means forming a quadrilaterial mounted free of contact with the remaining quadrilaterally formed photosensor means mounted upon said same individual image display plane; and said quadrilaterally formed photosensor means mounted upon each image display plane having a different mosaiclike pattern from the other mosaiclike patterns on said other image display planes.

13. A device, as claimed in claim 12, wherein said plurality of photosensor means includes means for receiving a predetermined portion of said image and for producing a varied output signal dependent upon the intensity of said portion of said image received.

14. A device, as claimed in claim 12, wherein each of said plurality of photosensor means comprise a plurality of individual light sensor elements mounted within a surrounding housing with said individual light sensor element mounted in a closely spaced side-by-side and row-by-row configuration.

15. A device, as claimed in claim 14, wherein said individual light sensor elements are photovoltaic cells.

16. A device, as claimed in claim 14, wherein said individual light sensor elements are mounted in a square configuration.

17. A device, as claimed in claim 14, wherein said individual light sensor elements are charged coupled devices.

18. A device, as claimed in claim 14, wherein said individual light sensor elements are charge injection devices.

19. A device, as claimed in claim 14, wherein said individual light sensor elements are photoconductive cells.

20. A device, as claimed in claim 12, wherein said beam splitter comprises:
   a first block having a longitudinal length three times its height;
   a second block having a longitudinal length twice its height;
   a third block having a longitudinal length equal to its height; and
   each block having a partially reflective surface mounted at an angle to said longitudinal length to reflect said image toward at least four image display planes two of which are mounted in common upon one of said blocks.

21. A device, as claimed in claim 12, additionally comprising:
   processing means;
   means for connecting said plurality of photosensor means to said processing means; and
   display means connected to said processing means wherein said image received by said device and split to said plurality of image display planes is recombined by said processing means at said display means.

22. A device, as claimed in claim 12, wherein said plurality of photosensor means include means for receiving a predetermined portion of said image and for producing a high or low output signal depending upon the intensity of said portion or said image received.

23. A device, as claimed in claim 12, wherein said beam splitter comprises:
   a first block having a longitudinal length four times its height;
   a second block having a longitudinal length three times its height;
   a third block having a longitudinal length two times its length;
   a fourth block having a longitudinal length equal to its height; and
   each block having a reflective surface mounted at an angle to said longitudinal length to reflect said image toward four image display planes each formed upon one of said blocks.

24. A device, as claimed in claim 23, wherein said four image planes are all formed in parallel planes.

25. A device, as claimed in claim 23, additionally comprising;
   said image to be displayed is formed by radiological rays;
   a shield mounted upon said beam splitter to prevent said radiological rays from reaching said four image planes; and
   said four image planes formed in parallel to said radiological rays.

26. A device for displaying a large, two dimensional image, comprising:
   beam splitter means for receiving said image having a plurality of image display planes;
   a plurality of photosensor means mounted in juxtaposition with each of said plurality of image display planes;
   each of said plurality of photosensor means mounted in juxtaposition with an individual image display plane having active elements formed in a configuration of four equal sides;
   each photosensor means separately mounted from the other, in juxtaposition with said individual image plane, by a distance equal to one of said four sides.

* * * * *